US012011966B2

(12) United States Patent
López Estévez (10) Patent No.: US 12,011,966 B2
(45) Date of Patent: Jun. 18, 2024

(54) ROBOTIC DEVICE

(71) Applicant: Dyson Technology Limited, Wiltshire (GB)

(72) Inventor: Miguel López Estévez, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 29 days.

(21) Appl. No.: 17/797,044

(22) PCT Filed: Feb. 24, 2021

(86) PCT No.: PCT/GB2021/050461
§ 371 (c)(1),
(2) Date: Aug. 2, 2022

(87) PCT Pub. No.: WO2021/171004
PCT Pub. Date: Sep. 2, 2021

(65) Prior Publication Data
US 2023/0064598 A1    Mar. 2, 2023

(30) Foreign Application Priority Data
Feb. 27, 2020 (GB) .................................. 2002773

(51) Int. Cl.
*B60G 3/18* (2006.01)
*B60B 19/00* (2006.01)
*B60G 13/00* (2006.01)

(52) U.S. Cl.
CPC .............. *B60G 3/185* (2013.01); *B60B 19/00* (2013.01); *B60G 13/00* (2013.01)

(58) Field of Classification Search
CPC .......... B62D 61/06; B60G 3/20; B60G 13/00; B60G 3/185; B60B 19/00
See application file for complete search history.

(56) References Cited

U.S. PATENT DOCUMENTS 2,148,029 A * 2/1939 Matthews ............ B60G 11/181
267/273
6,318,522 B1 * 11/2001 Johnston ................. F16F 9/145
192/208
(Continued)

FOREIGN PATENT DOCUMENTS

CN    106585305 A * 4/2017 ............. B60G 13/00
CN    107416069 A * 12/2017 ........... B60G 17/021
(Continued)

OTHER PUBLICATIONS

International Search Report and Written Opinion received for PCT Patent Application No. PCT/GB2021/050461, mailed on May 11, 2021, 11 pages.
(Continued)

*Primary Examiner* — Amy R Weisberg
*Assistant Examiner* — Maxwell L Meshaka
(74) *Attorney, Agent, or Firm* — Tucker Ellis LLP; Michael G. Craig (57) ABSTRACT

A vehicle includes a wheel to contact a surface having a reference surface plane in operation of the vehicle; a chassis; an axle housing having an axis which is normal to the reference surface plane; and an axle. The axle extends from the axle housing, to couple the wheel to the axle housing and to support rotation of the wheel relative to the axle housing to support motion of the vehicle across the surface in operation of the vehicle. A suspension system couples the wheel to the chassis and includes a linkage assembly having a first end pivotably coupled to the chassis and a second end pivotably coupled to the axle housing. The first end of the linkage assembly is spaced apart laterally from the second end of the linkage assembly along a longitudinal axis of the linkage assembly. The suspension system is configured to maintain the axis of the axle housing at an angle normal to the reference surface plane in response to an angular dis- (Continued)

placement between the chassis and the reference surface plane.

15 Claims, 6 Drawing Sheets

(56) References Cited

U.S. PATENT DOCUMENTS

| | | | | |
|---|---|---|---|---|
| 7,628,414 | B2* | 12/2009 | Dobson | B60G 17/0162 |
| | | | | 280/124.152 |
| 8,985,610 | B2* | 3/2015 | Juan | B60G 3/185 |
| | | | | 280/285 |
| 9,120,361 | B2 | 9/2015 | Willems | |
| 10,723,191 | B1* | 7/2020 | Sardes | B60G 3/207 |
| 10,946,706 | B2* | 3/2021 | Sardes | B60G 3/22 |
| 11,117,433 | B2* | 9/2021 | Johnson | B60G 7/02 |
| 11,524,538 | B2* | 12/2022 | Sardes | B60G 3/22 |
| 11,571,939 | B2* | 2/2023 | Berardi | B60G 3/18 |
| 2006/0027990 | A1* | 2/2006 | Dobson | B60G 3/20 |
| | | | | 280/124.106 |
| 2011/0275256 | A1* | 11/2011 | Gibbs | B62K 5/027 |
| | | | | 440/12.51 |
| 2014/0251710 | A1* | 9/2014 | Juan | B60G 11/16 |
| | | | | 180/218 |
| 2018/0327038 | A1* | 11/2018 | Battaglini | B62D 61/065 |
| 2019/0117032 | A1 | 4/2019 | Supron et al. | |
| 2019/0248201 | A1* | 8/2019 | Johnson | B60G 11/27 |
| 2020/0180375 | A1* | 6/2020 | Sardes | B60G 3/185 |
| 2020/0247202 | A1* | 8/2020 | Sardes | B60G 3/185 |
| 2021/0039463 | A1* | 2/2021 | Sardes | B60G 3/185 |
| 2021/0260947 | A1* | 8/2021 | Sardes | B60G 3/185 |
| 2021/0276383 | A1* | 9/2021 | Gordon | B60G 3/20 |
| 2022/0111692 | A1* | 4/2022 | Berardi | B60G 3/20 |
| 2022/0204078 | A1* | 6/2022 | Aknin | B60G 7/006 |
| 2022/0332159 | A1* | 10/2022 | Corsico | B60G 3/20 |
| 2023/0052874 | A1* | 2/2023 | Sardes | B60G 3/185 |
| 2023/0064598 | A1* | 3/2023 | López Estévez | B62D 61/06 |

FOREIGN PATENT DOCUMENTS

| | | | | |
|---|---|---|---|---|
| CN | 110667703 | A | * | 1/2020 |
| CN | 113524999 | A | * | 10/2021 |
| DE | 10329689 | A1 | | 2/2005 |
| DE | 102017201682 | A1 | * | 8/2018 |
| DE | 102017210058 | A1 | * | 12/2018 |
| EP | 3476268 | A1 | | 5/2019 |
| FR | 2979322 | A1 | | 3/2013 |
| JP | 09-066716 | A | | 3/1997 |
| JP | 2008-155652 | A | | 7/2008 |
| JP | 2019-209896 | A | | 12/2019 |
| WO | 2007/149255 | A2 | | 12/2007 |
| WO | 2019/000436 | A1 | | 1/2019 |
| WO | 2019/128226 | A1 | | 7/2019 |
| WO | WO-2023180687 | A1 | * | 9/2023 ............... B60G 3/20 |

OTHER PUBLICATIONS

Search Report for GB Patent Application No. 2002773.6, Issued on Aug. 17, 2020, 1 page.
Office Action received for Japanese Patent Application No. 2022-551803, mailed on Oct. 3, 2023, 5 pages (3 pages of English Translation and 2 pages of Original Document).

* cited by examiner

ROBOTIC DEVICE

CROSS-REFERENCE TO PRIOR APPLICATION

This application is a § 371 National Stage Application of PCT International Application No. PCT/GB2021/050461 filed Feb. 24, 2021, which claims the priority of United Kingdom Application No. 2002773.6, filed Feb. 27, 2020, each of which are herein incorporated by reference in their entirety.

TECHNICAL FIELD

The present invention relates to a vehicle, and particularly, but not exclusively, to a robotic vehicle. The present invention may find application as an autonomous robot, for example, a domestic autonomous robot.

BACKGROUND

Some existing robotic vehicles, such as robotic vacuum cleaners, have two standard drivable wheels and a castor wheel, all of which operate together to allow the vehicle travel across a surface, such as a floor. To move forwards in a straight line, the standard wheels are both driven in unison. To turn, one of the standard wheels can be driven, or one of the standard wheels can be driven at a faster rate than the other wheel, which causes the robotic vehicle to spin. In these robotic vehicles, motion and control can be somewhat limited due to the use of standard wheels. For example, the turning circle of such robotic vehicles can be large, and the front end of the robot will generally have to face the direction of travel.

In contrast, a holonomic wheel can move a vehicle in any direction without the vehicle itself having to turn around and/or face another direction. Accordingly, some existing robotic vehicles utilise holonomic wheels to improve the manoeuvrability of the robot. For example, robotic vehicles having holonomic wheels can have a smaller turning circle, and the chassis/body of the robot can remain facing a particular direction as the robot changes its direction of travel.

Human environments can present unique challenges for robotic vehicles. These environments can alter from day to day, as furniture and other obstacles may be moved, introduced or removed, and a robotic vehicle needs to be able to adapt to and/or navigate around these changes. Surfaces over which the robot traverses can be inherently uneven, or objects laying on top of an otherwise flat surface can create an uneven surface for the robot. As the robot moves over these uneven surfaces, the chassis of the robot can tilt, so that a plane of the chassis that is usually horizontal rotates relative to the usual or 'reference' plane of the surface. This rotation can cause a wheel to slip or spin. Suspension may be employed to increase contact with the surface during such times.

SUMMARY

According to a first aspect, the present invention defines a vehicle comprising a wheel to contact a surface, where the surface has a reference surface plane in operation of the vehicle. The vehicle further comprises a chassis (or body), an axle housing having an axis which is normal to the reference surface plane, an axle extending from the axle housing to couple the wheel to the axle housing and to support rotation of the wheel relative to the axle housing and, thereby, to support motion of the vehicle across the surface in operation of the vehicle. The vehicle further comprises a suspension system coupling the wheel to the chassis, where the suspension system comprises a linkage assembly having a first end pivotably coupled to the chassis and a second end pivotably coupled to the axle housing. The first end of the linkage assembly is spaced apart laterally from the second end of the linkage assembly along a longitudinal axis of the linkage assembly. The suspension system is configured to maintain the axis of the axle housing at an angle normal to the reference surface plane in response to an angular displacement between the chassis and the reference surface plane.

In conceiving the present invention, it has been appreciated that any tilting or rotation of the chassis of a vehicle relative to a usual reference surface plane may be transferred to a wheel (or, to each wheel), so that a usually 'upright' wheel may correspondingly tilt or rotate relative to the reference surface plane. Such a transfer may arise irrespective of whether or not the wheel is connected to the chassis via a suspension arrangement. Indeed, certain suspension arrangements may exacerbate the tilt or rotation that is imparted to the wheel. In the case of the wheel being a holonomic wheel, it has moreover been appreciated that a tilting or rotation of the wheel away from its upright or normal orientation relative to the reference surface plane, can lead to the wheel changing direction. This is because any such tilt potentially moves the wheel away from the associated holonomic constraints or conditions that determine how the wheel behaves. For instance, control signals that cause an 'upright' (i.e. un-tilted) holonomic wheel to drive a vehicle on a flat surface forwards by one meter and then to the right by one meter, may no longer apply if the holonomic constraints or conditions no longer apply. Indeed, the same control signals may cause the wheel to move the vehicle unpredictably, for instance in a direction that was not intended, which could be hazardous.

The vehicle according to the first aspect therefore has a suspension system supporting the axle housing, where the suspension system is arranged to counteract the rotation of the chassis as the vehicle traverses an uneven surface. In this way, even if the chassis rotates, for example due to one of the wheels rising over an object or dropping into a recess, the suspension system is arranged to reduce or avoid a corresponding rotation or tilt being imparted to the axle housing and hence to the respective wheel. Accordingly, the rotation or tilting of the chassis is not imparted to the respective wheel and, in the case of the wheel being a holonomic wheel, its holonomic constraints or conditions are maintained. In this way, predictable control and operation of the wheel can be sustained even when the vehicle is somehow perturbed and/or travelling over an uneven surface.

The "surface", also referred to as a reference surface, defines a reference surface plane. The reference surface plane is a flat, two-dimensional plane. An angular displacement of the chassis can therefore be defined relative to this reference surface or the reference surface plane. Alternatively, the angular displacement of the chassis may be defined relative to an initial position of the vehicle before the chassis is displaced/rotated. In the initial position/configuration, the vehicle may be arranged on a substantially flat surface, and in a rotated position/configuration the chassis an angular displacement relative to the initial position, and may be arranged on an uneven surface.

The surface may be a ground surface or a floor. The surface may be substantially horizontal, in some examples.

In some examples, the axle, and therefore an axis defined by the axle, is arranged parallel to the reference surface plane.

The chassis of the vehicle may be known as a body.

The ends of the of the linkage assembly may be defined by physical, terminal ends of the linkage assembly. Alternatively, the ends of the linkage assembly may be defined by the regions that are coupled to the chassis and axle housing. In this second example, it will be appreciated that terminal ends of the linkage assembly may extend beyond the points that are coupled to the chassis and axle housing, because such a linkage assembly can achieve substantially the same result in substantially the same way.

The invention may find particular use in the following non-limiting examples. The vehicle may comprise a front wheel and a back wheel. In a first example, as the vehicle moves across a surface, the rear wheel encounters an object. As the rear wheel passes over the object, the chassis of the vehicle rotates and undergoes an angular displacement relative to an initial position on a reference surface plane. For example, the rear end of the chassis may move vertically, and rotate the rear end of the chassis away from the surface. The front wheel is coupled to an axle housing via an axle, and the axle housing is coupled to the chassis via the above described suspension system. As mentioned, it may be undesirable for the front wheel and its axle housing to be rotated to the same degree as the chassis. Accordingly, the axle housing of the front wheel is supported by suspension system that is configured to lessen or reduce the rotation imparted by the rotation of the chassis. The front wheel therefore experiences substantially no rotational/angular displacement as the rear wheel drives over the object. Similarly, in a second example, the front wheel encounters an object. In this example, the suspension system of the front wheel can also lessen or reduce rotation imparted by the rotation of the chassis.

In some examples, the vehicle further comprises a propulsion system to drive motion of the vehicle across a surface. For example, the propulsion system may be configured to drive the wheel, or another wheel of the vehicle. The propulsion system may comprise one or more motors to drive the wheel. In a particular example, the axle housing comprises a motor to drive the wheel.

In certain examples, the angular displacement is imparted by at least one of (i) a vertical displacement between the wheel and the reference surface plane, (ii) a vertical displacement between a second wheel of the vehicle and the reference surface plane, and (iii) a vertical displacement between the wheel and a second wheel of the vehicle.

The suspension system is configured to permit relative vertical movement between the axle housing and the chassis. For example, the suspension system may comprise a biasing member, such as a spring or resilient member, to allow the axle housing to move relative to the chassis. Thus, as the wheel encounters an object, the axle housing may move vertically upwards relative to the chassis while the chassis remains initially stationary due to inertia. The biasing member may be pivotably coupled to both the axle housing and the chassis. For example, one end of the biasing member may be pivotably coupled to the axle housing, and another end of the biasing member may be pivotably coupled to the chassis. This allows the biasing member to rotate relative to the chassis and axle housing as the chassis rotates.

In a particular example, the suspension system comprises the biasing member connecting the axle housing to the chassis, where the biasing member is configured to accept compressive and expansive vertical displacements between the axle housing and the chassis. The biasing member allows relative vertical movement between the axle housing and the chassis. When the vehicle is arranged on the reference surface plane, the biasing member may be orientated substantially parallel to the axis of the axle housing. In an example, the biasing member is pivotably coupled to both the axle housing and the chassis. In some examples, the biasing member comprises a spring.

In a particular example, the suspension system comprises a shock absorber, and the shock absorber comprises the biasing member. The suspension system can therefore absorb any energy that is transferred to the vehicle.

In a particular configuration, the first end of the linkage assembly is pivotably coupled to the chassis at a first joint and a second joint, the second joint being spaced from the first joint. The second end of the linkage assembly is pivotably coupled to the axle housing at a third joint and a fourth joint, the fourth joint spaced from the third joint. The linkage assembly may therefore be coupled to the chassis at two locations, and be coupled to the axle housing at two locations. The rotations between the chassis, linkage assembly and axle housing, as well as the relative vertical displacement/movement provided by the suspension system provides a particularly effective system to maintain the axis of the axle housing at an angle normal to the reference plane.

In a particular arrangement, a distance between the first joint and second joint is greater than a distance between the third and fourth joint. This particular spacing of joints can allow the linkage assembly to reduce or remove the rotation applied to the axle housing.

The linkage assembly may comprise a first suspension arm pivotably connected to the chassis at the first joint and the axle housing at the third joint. The linkage assembly may further comprise a second suspension arm pivotably connected to the chassis at the second joint and the axle housing at the fourth joint. The linkage assembly may therefore be an arrangement of suspension arms that pivot relative to the axle housing and chassis to achieve the desired effect of maintaining the axis of the axle housing at an angle normal to the reference plane. The first and second suspension arms may be substantially rigid. The linkage assembly may comprise a damper connected between the chassis and the axle housing. The damper may be separate to, or form part of the shock absorber.

In another arrangement, the linkage assembly may comprise a damper pivotably connected to the chassis at the first joint, a first suspension arm connected to: (i) the damper (at another joint), and (ii) the axle housing at the third joint. The linkage assembly may further comprise a second suspension arm pivotably connected to the chassis at the second joint and the axle housing at the fourth joint. The first suspension arm may be pivotably connected to the damper. The damper is configured to dampen oscillations between the chassis and the axle housing to further improve the control and manoeuvrability of the vehicle on uneven surfaces. In a particular arrangement the damper is a rotary damper. In other examples, the damper is a linear damper.

The first suspension arm may have a first length, and the second suspension arm may have a second length, where the second length is longer than the first length. These particular lengths of joints can allow the linkage assembly to reduce or remove the rotation applied to the axle housing.

In an example, the chassis comprises: (i) an inner portion, (ii) a first outer portion arranged on a first side of the wheel, and (iii) a second outer portion arranged on a second side of the wheel. The axle housing resides between first and second outer portions and between the inner portion and the wheel.

Accordingly, portions of the chassis may at least partially surround or extend around the wheel and axle housing. For example, the chassis may comprise a cut-out/alcove/recess to fully or partially receive the wheel. This can reduce the overall footprint of the vehicle. In addition, the axle housing is located away from the outer perimeter of the chassis, and is therefore less exposed, so is free to move relative to the chassis without damaging objects in the vicinity of the vehicle.

The inner portion of the chassis is arranged closer to the centre of the vehicle than the first and second outer portions.

The first and second outer portions may be arranged on opposite sides of the wheel.

The first end of the linkage assembly may be coupled to the first outer portion of the chassis on the first side of the wheel, and the longitudinal axis of the linkage assembly extends inwardly towards the inner portion of the chassis where the second end of the linkage assembly couples to a first side of the axle housing. Such an arrangement provides improved space efficiency because the suspension system surrounds the wheel.

In a particular arrangement comprising a biasing member or shock absorber, the biasing member or shock absorber may also be arranged between the first and second outer portions, and may be connected to the first outer portion on the first side of the wheel and be connected to the first side of the axle housing.

In some example vehicles, the suspension system comprises a second linkage assembly having a first end pivotably coupled to the chassis and a second end pivotably coupled to the axle housing, where the first end of the linkage assembly is spaced apart laterally from the second end of the linkage assembly along a longitudinal axis of the linkage assembly. The second linkage assembly also allows the suspension system to maintain the axis of the axle housing at an angle normal to the reference surface plane in response to an angular displacement between the chassis and the reference surface plane. The second linkage assembly may comprise any or all of the features described above in relation to the first linkage assembly. The first and second linkage assemblies may be substantially the same.

The second linkage assembly additionally supports the axle housing. The use of two linkage assemblies can provide greater support to the axle housing. The use of two linkage assemblies in combination with a holonomic wheel additionally means that the suspension system operates in the desired way regardless of the direction of travel of the vehicle. For example, depending upon the orientations of the linkage assemblies in relation to the direction of travel, one of the linkage assemblies initially operates before the other linkage assembly.

In a particular arrangement, the second linkage assembly has a first end pivotably coupled to the second outer portion of the chassis and a second end pivotably coupled to a second side of the axle housing, wherein the first end of the second linkage assembly is spaced apart laterally from the second end of the second linkage assembly along a longitudinal axis of the second linkage assembly, the longitudinal axis of the second linkage assembly extending inwardly towards the inner portion of the chassis where the second end of the second linkage assembly couples to the second side of the axle housing.

The chassis is therefore connected to the (first) linkage assembly on one side of the wheel, and the chassis may be connected to the second linkage assembly on the other side of the wheel.

Thus, opposite sides of the wheel are supported by a linkage assembly. This arrangement can support the wheel in a more balanced manner.

In certain examples the wheel is a holonomic wheel. A holonomic wheel allows the vehicle to move in any direction across a surface.

As briefly mentioned above, the vehicle may also comprise a second wheel. The wheel described above may be a first wheel.

In a particular example, the vehicle additionally comprises a second wheel and a third wheel, where the first, second and third wheels are spaced apart equally around a central vertical axis of the chassis. In a particular example, the first, second and third wheels may be in a triangular arrangement. The vehicle may comprise three or more wheels.

In the above examples it is assumed that the perturbation of the vehicle causes the chassis of the vehicle to undergo an angular displacement. It will however be appreciated that not all uneven surfaces may impart such an angular displacement to the chassis. For example, small bumps may be absorbed by the suspension system without significant rotation of the chassis. In such instances, the suspension system is configured to maintain the axis of the axle housing at an angle normal to the reference surface plane in response to an angular displacement between the linkage assembly and the chassis. The angular displacement between the linkage assembly and the chassis may be imparted by a vertical displacement between the wheel and the reference surface plane. This vertical displacement causes the axle housing to move vertically relative to the chassis, which causes the linkage assembly to rotate. For example, members of the linkage assembly rotate about their respective connections to the chassis and axle housing. Thus, while the chassis itself does not rotate, the suspension system still retains the axis of the axle housing at an angle normal to the reference surface plane. The suspension system is therefore configured to maintain the axis of the axle housing at an angle normal to the reference surface plane by rotating relative to the chassis in response to a vertical displacement between the wheel and the reference surface plane.

Further features and advantages of the invention will become apparent from the following description of preferred embodiments of the invention, given by way of example only, which is made with reference to the accompanying drawings.

DETAILED DESCRIPTION

Examples of the invention relate to an autonomous domestic robot or robotic vehicle. Such a robot may be configured to vacuum floors or perform other cleaning tasks around the home. Needless to say, the same configuration of vehicle may find application in many other areas, such as commercial or military robots. Indeed, the same suspension system as is described herein may find application in human-driven vehicles.

Figure 1:
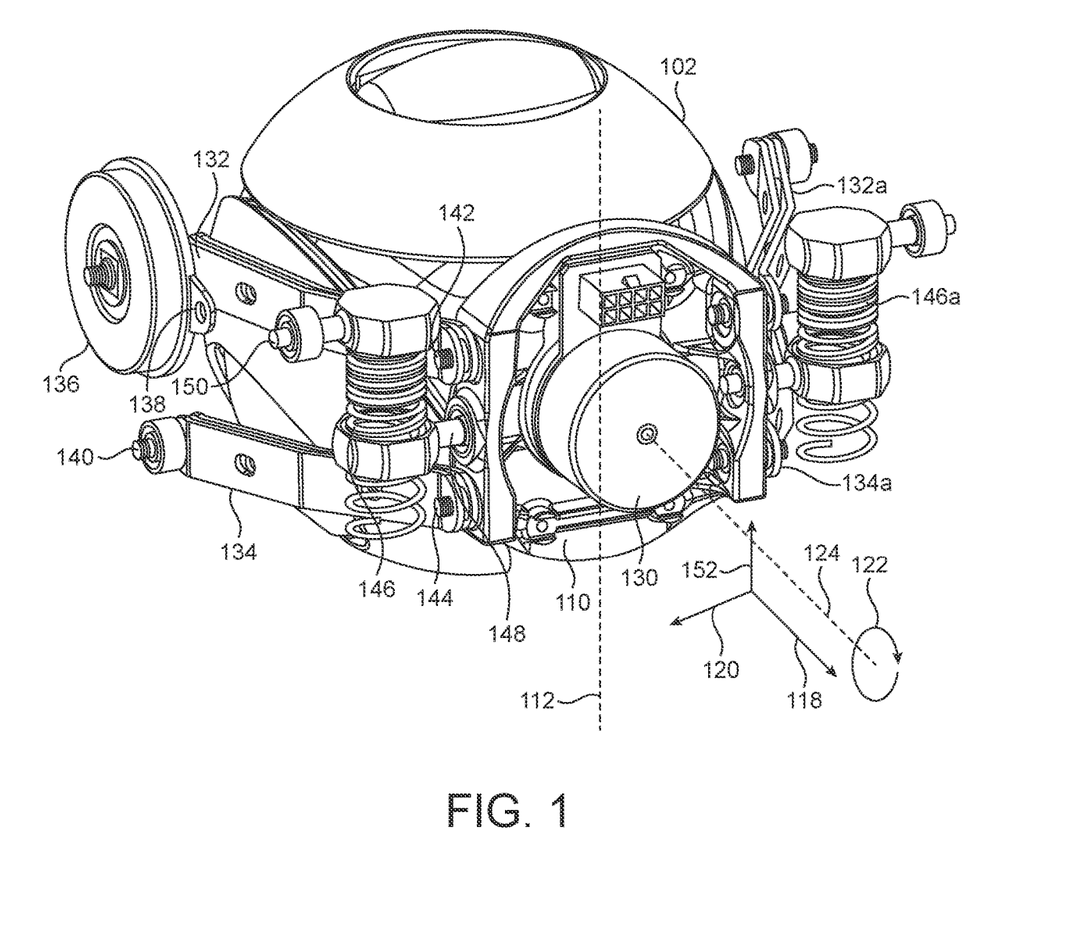
FIG. 1 is a perspective view of a holonomic wheel coupled to a suspension system according to an example.

FIG. 1 is a perspective view of a suspension system arranged to support a wheel 102 of a vehicle. The wheel in the following examples is a spherical holonomic wheel 102. However, it will be appreciated that the principles of the suspension system can be applied to other types of wheels and, in particular, to other types of holonomic wheels.

Figure 2:
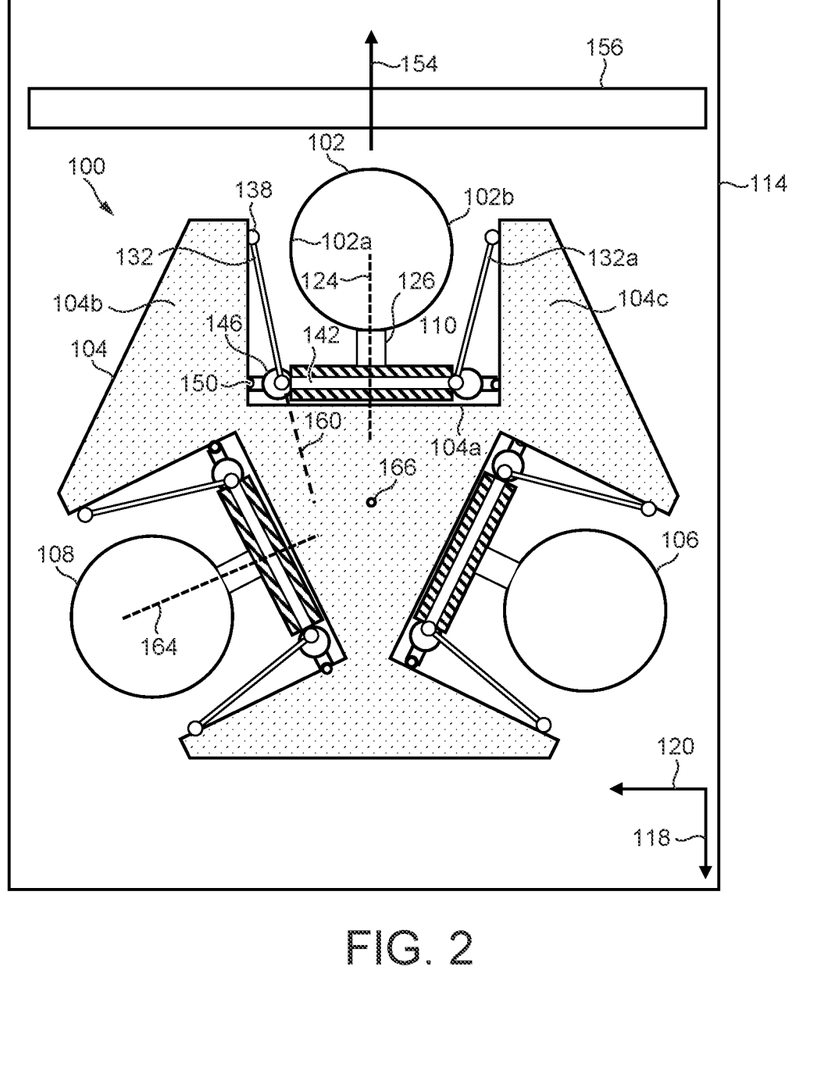
FIG. 2 is schematic diagram of a top-down view of a robotic vehicle comprising the holonomic wheel and suspension system of FIG. 1.
Figure 3:
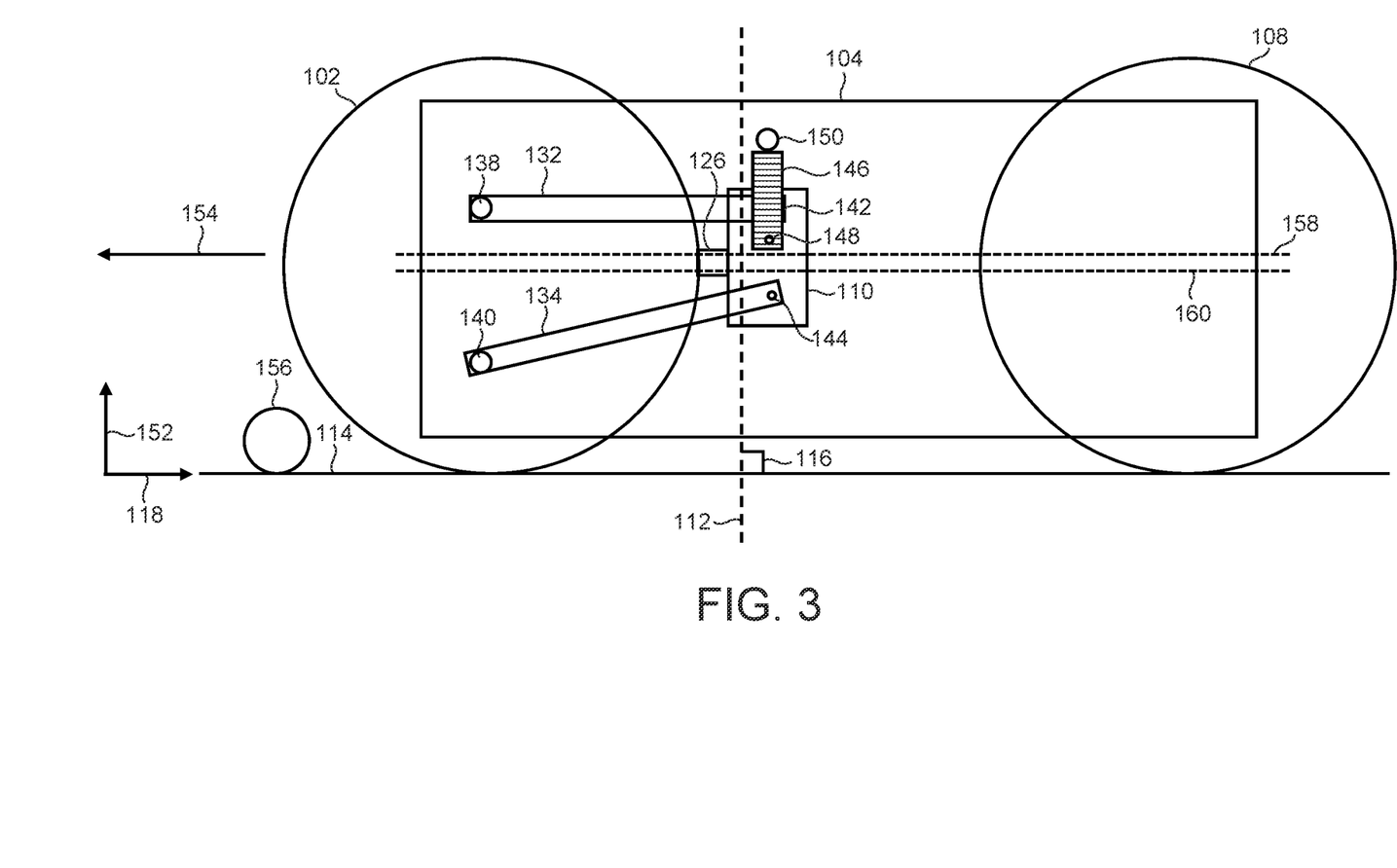
FIG. 3 is a schematic diagram of a side elevation of FIG. 2.

FIG. 2 is a schematic diagram of a top-down view of a vehicle 100, according to an example, comprising the suspension system depicted in FIG. 1. FIG. 3 shows a side elevation view of the vehicle 100. The vehicle 100 has a chassis 104, a first wheel 102 operating as a leading wheel, a second wheel 106 operating as a first trailing wheel, and a third wheel 108 operating as a second trailing wheel. The first, second and third wheels 102, 106, 108 are all holonomic in this example, so any of the wheels can function as a leading wheel or trailing wheel depending upon the direction of travel. By independently controlling the first, second and third wheels 102, 106, 108, the vehicle 100 can travel in any direction across a surface without turning, rotating, or otherwise altering the orientation of the chassis 104. In this example, the wheels are spaced apart equally around a central axis 166 of the chassis 104 (i.e. the first, second and third wheels 102, 106, 108 are spaced apart by 120 degrees).

The chassis 104 has a generally hexagonal shape in this example, but may take any other shape or form.

The vehicle 100 comprises an axle housing 110 having an axis 112, which is normal to a reference surface plane defined by a reference surface 114 (shown in FIGS. 2 and 3). Thus, an angle 116 between the reference surface 114 and the axis 112, absent any external forces or objects under wheels, is typically 90 degrees. Usually, the reference surface 114 is the ground or floor over which the vehicle 100 travels, and the reference surface plane coincides with the floor, ignoring any foreign objects or obstacles. The reference surface 114 is a flat surface and is arranged horizontally in this example. When the vehicle 100 is positioned on the surface 114, the chassis 104, or at least a plane running through the chassis 104, is parallel to the reference surface plane. The surface 114 extends in two dimensions, along a first axis 118 and a second axis 120, where the second axis 120 is perpendicular to the first axis 118.

The axle housing 110 is coupled to, and supports, an axle 126 of the wheel 102, so that the wheel 102 can rotate with or about the axle 126. The particular type of holonomic wheel 102 depicted in FIGS. 1, 2 and 3 has an axle 126 that defines a rotational axis 124 that is parallel to the reference surface plane. The wheel 102 therefore rotates in a direction depicted by arrow 122 (or in an opposite direction) as shown in FIG. 1.

According to the present example, the axle housing 110 supports a motor to drive the wheel 102 and the motor is housed in a motor housing 130. In operation, the motor causes the wheel 102 to rotate about the rotational axis 124. The motor may be part of a propulsion system, for example. The propulsion system drives motion of the chassis 104 across the surface. In some examples, the chassis 104 houses some or all parts of the propulsion system.

The suspension system comprises a linkage assembly having a first end pivotably coupled to the chassis 104 and a second end pivotably coupled to the axle housing 110. In the particular example of FIG. 1, the linkage assembly comprises a first suspension arm 132 and a second suspension arm 134. The first suspension arm 132 is connected to a rotary damper 136 at one end of the suspension arm 132. The rotary damper 136 forms part of the linkage assembly, and is pivotably coupled to the chassis at a first joint 138. In alternative examples, the rotary damper 136 is omitted, and the first suspension arm 132 is pivotably coupled to the chassis 104 at a first joint 138. Indeed, in FIGS. 2-6, the rotary damper 136 is omitted, and the first suspension arm 132 is coupled directly to the chassis 104 at the first joint 138. The second suspension arm 134 is also pivotably coupled to the chassis 104 at a second joint 140. The first and second joints 138, 140 are spaced apart on the chassis 104. The first and second suspension arms 132, 134 can therefore rotate relative to the chassis 104 about their respective connections to the chassis 104. In other examples, the rotary damper 136 is connected between the second suspension arm 134 and the second joint 140.

The other end of the first suspension arm 132 is pivotably coupled to the axle housing 110 at a third joint 142. Similarly, the other end of the second suspension arm 134 is also pivotably coupled to the axle housing 110 at a fourth joint 144. The third and fourth joints 142, 144 are spaced apart on the axle housing 110. The first and second suspension arms 132, 134 can therefore also rotate relative to the axle housing 110.

Accordingly, a first end of the linkage assembly is pivotably coupled to the chassis 104, and a second end of the linkage assembly is pivotably coupled to the axle housing 110. The linkage assembly therefore has a longitudinal axis 160 (shown in FIGS. 2 and 3) that extends generally along, but not necessarily parallel to the first axis 118 and the rotational axis 124 of the axle 126. The first end of the linkage assembly is spaced apart laterally from the second end of the linkage assembly along the longitudinal axis 160 of the linkage assembly.

Although the linkage assembly in this example has first and second suspension arms 132, it will be appreciated that the linkage assembly may comprise fewer or more components in other examples.

In the present example, the suspension system also comprises a second linkage assembly that is substantially the same as the first linkage assembly described above. FIGS. 1 and 2 show a second linkage assembly arranged on an opposite side of the wheel 102. The second linkage assembly therefore also has a first end pivotably coupled to chassis 104 and a second end pivotably coupled the axle housing 110. In this particular example, the second linkage assembly also has two suspension arms 132a, 134a. The second linkage assembly does not have a rotary damper 136 in this example, but may do so in other examples. Accordingly, ends of the two suspension arms 132a, 134a, are directly coupled to the chassis 104, while the other ends of the suspension arms 132a, 134a are coupled to the axle housing 110.

As will be described in more detail herein, the suspension system is configured to permit relative vertical movement between the axle housing 110 and the chassis 104. Vertical movement is any motion away from or towards the reference surface 114. Vertical movement is therefore any motion along a third axis 152 where the third axis 152 is perpendicular to both the first and second 118, 210 axes. To allow this relative vertical movement, the suspension system comprises a biasing member 146, such as a compression spring. The biasing member 146 is pivotably coupled to both the axle housing 110 and the chassis 104. For example, one end of the biasing member is pivotably coupled to the axle housing 110 at a fifth joint 148 (which is located at a midpoint between the third and fourth joints 142, 144) and the other end of the biasing member 146 is pivotably coupled to the chassis 104 at a sixth joint 150. The biasing member 146 of this example comprises end portions which provide attachment points, to allow the biasing member 146 to be connected to the chassis 104 and the axle housing 110. The biasing member 146 can be compressed and expanded to allow vertical displacement between the axle housing 110 and the chassis 104. This displacement also causes the linkage assemblies to rotate.

The example of FIG. 1 comprises two biasing members 146, 146a, and so the suspension system has a biasing member associated with each linkage assembly. In other examples, there may be one or more than two biasing members.

In the present example, the biasing member 146 forms part of a shock absorber. The shock absorber further comprises a damper (not shown) to absorb and dissipate energy as the biasing member 146 is compressed. The shock absorber may comprise a linear damper, and may be used in addition to, or instead of the rotary damper 136. The linear damper could be located parallel to the biasing member 146 between the fifth and sixth joints 148, 150. In other arrangements, the linear damper is separate to the biasing member 146 and is connected between the chassis 104 and the axle housing 110 at different locations.

As mentioned, FIG. 2 shows the suspension system connected to the chassis 104 of the vehicle 100. In this example, the chassis 104 comprises an inner portion 104a, a first outer portion 104b arranged on a first side 102a of the wheel 102 and a second outer portion 104c arranged on a second side 102b of the wheel 102. The first and second outer portions 104b, 104c extend outwardly from a main central body of the chassis 104 and partially surround the wheel 102. The axle housing 110 therefore is located between first and second outer portions 104b, 104c and between the inner portion 104a and the wheel 102. In this particular example, the first and second outer portions 104b, 104c are arranged on opposite sides of the wheel 102. The second and third wheels 106, 108 are similarly arranged such that the chassis 104 comprises a central portion and three wheel supporting portions, where each wheel supporting portion comprises an inner portion, and first and second outer portions.

The first and second outer portions provide regions to which the linkage assemblies can be connected to the chassis 104. For example, in the case of the first wheel 102 and the first linkage assembly, the first end of the linkage assembly is coupled to the first outer portion 104b on a first side 102a of the wheel 102, and the longitudinal axis 160 of the linkage assembly extends inwardly towards the inner portion 104a of the chassis 104 where the second end of the linkage assembly couples to a first side of the axle housing 110. Similarly, a first end of the second linkage assembly is coupled to the second outer portion 104c on a second side 102b of the wheel 102, and the longitudinal axis 160 of the second linkage assembly extends inwardly towards the inner portion 104a of the chassis 104 where the second end of the second linkage assembly couples to a second side of the axle housing 110.

As will now be described in relation to FIGS. 2-6, the components of the suspension system work together to maintain the axis 112 of the axle housing 110 at an angle 116 normal to the reference surface plane in response to an angular displacement between the chassis 104 and the reference surface plane. In these Figures, the mechanics of just one linkage assembly is described. It will be appreciated that substantially the same mechanics apply to the second linkage assembly.

FIGS. 2 and 3 depict the vehicle 100 moving across a flat surface 114, such as a floor, in a first direction 154. At this moment in time, all three wheels 102, 106, 108 are in contact with the surface 114 and the chassis 104 is orientated parallel to the surface 114 and the reference surface plane. Accordingly, the longitudinal axis 158 of the chassis 104 is arranged substantially parallel to the reference surface plane. At this time, the suspension system is substantially unperturbed. For example, the biasing member 146 is arranged in an equilibrium position. In this equilibrium position, the weight of the chassis 104 and the reaction force of the biasing member 146 are equal. In FIG. 3, the biasing member 146 is illustrated as a simplified spring to more easily visualise the state of the spring.

As shown in FIGS. 2 and 3, the vehicle 100 is approaching an object 156 as it travels in the first direction 154. The object 156 provides an uneven surface over which the vehicle 100 must travel.

As briefly mentioned, FIG. 3 depicts the suspension system with the rotary damper of FIG. 1 omitted. The first suspension arm 132 is therefore coupled to the chassis 104 at a first joint 138. The first suspension arm is also coupled the axle housing 110 at the third joint 142, which is hidden behind the biasing member 146. The second suspension arm 134 is coupled to the chassis 104 at the second joint 140 and to the axle housing 110 at the fourth joint 144. The biasing member 146 is also coupled to the axle housing 110 at the fifth joint 148 and the chassis 104 at the sixth joint 150.

FIG. 3 additionally depicts the longitudinal axis 160 of the linkage assembly. As shown, the second end of linkage assembly is laterally displaced from the first end of the linkage assembly along the longitudinal axis 160. The second end of the linkage assembly comprises the ends of the suspension arms 132, 134 that are coupled to the axle housing 110 and the first end of the linkage assembly comprises the ends of the suspension arms 132, 134 that are coupled to the chassis 104.

Figure 4:
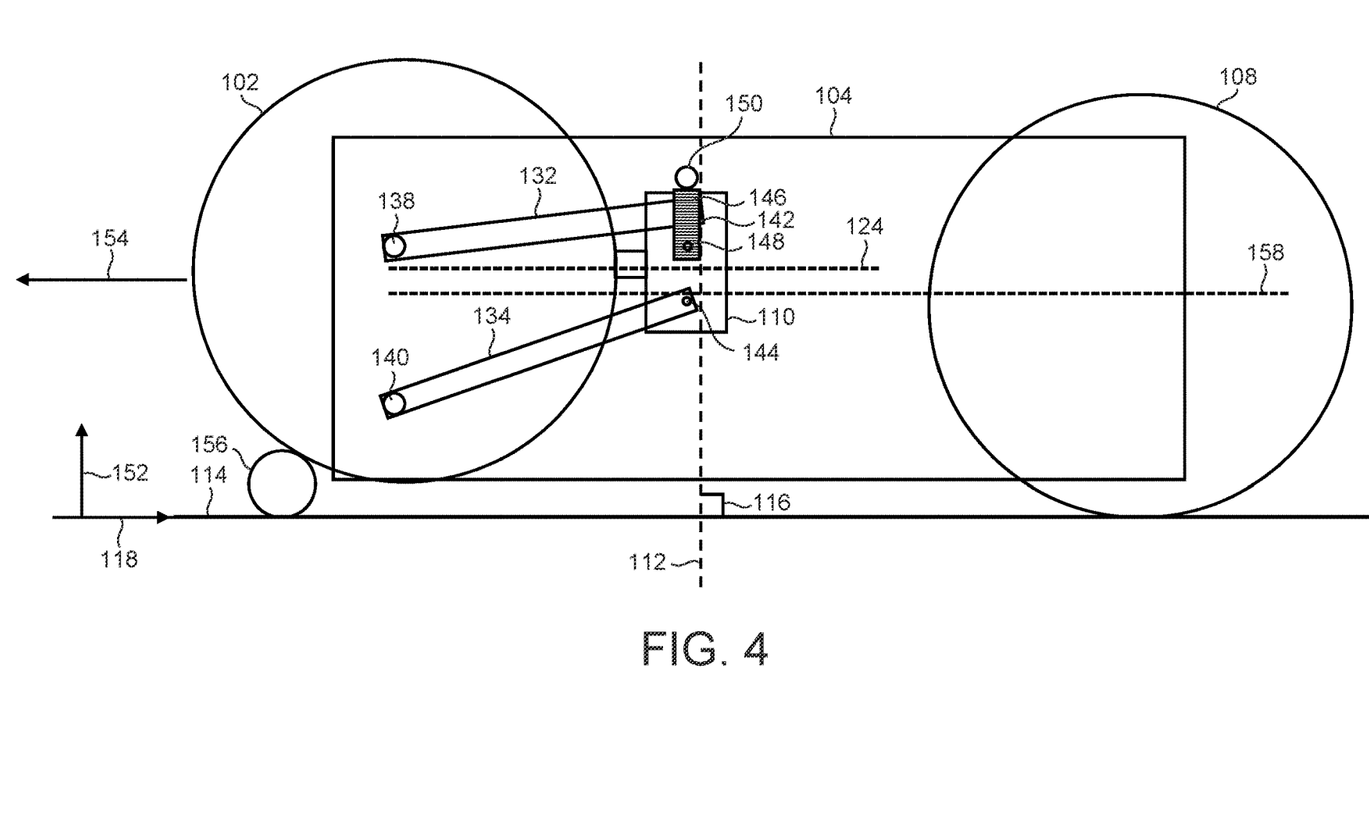
FIG. 4 is a schematic diagram of the robotic vehicle of FIG. 3 with a wheel at the point of initial impact with an object.

From the position depicted in FIGS. 2 and 3, the vehicle 100 continues moving in the first direction 154 until the wheel 102 impacts the object 156. FIG. 4 depicts the vehicle 100 just after this initial impact. In FIG. 4, the wheel 102, axle 126, and axle housing 110 have moved vertically (i.e. in a direction along the third axis 152) relative to the chassis 104 due to a vertical component of the impact force on the wheel 102. In this initial impact state, the chassis 104 remains substantially in the pre-impact position of FIG. 3 due to inertia. As a result of the vertical movement to the wheel 102 and axle housing 110, the biasing member 146 is compressed and the first and second suspension arms 132, 134 pivot about joints 138, 140, 142, 144. The suspension system therefore permits relative vertical movement between the axle housing 110 and the chassis 104, and maintains the axis 112 of the axle housing 110 at an angle 116 normal to the reference surface plane in response to a vertical displacement between the wheel 102 and the reference surface plane.

Figure 5:
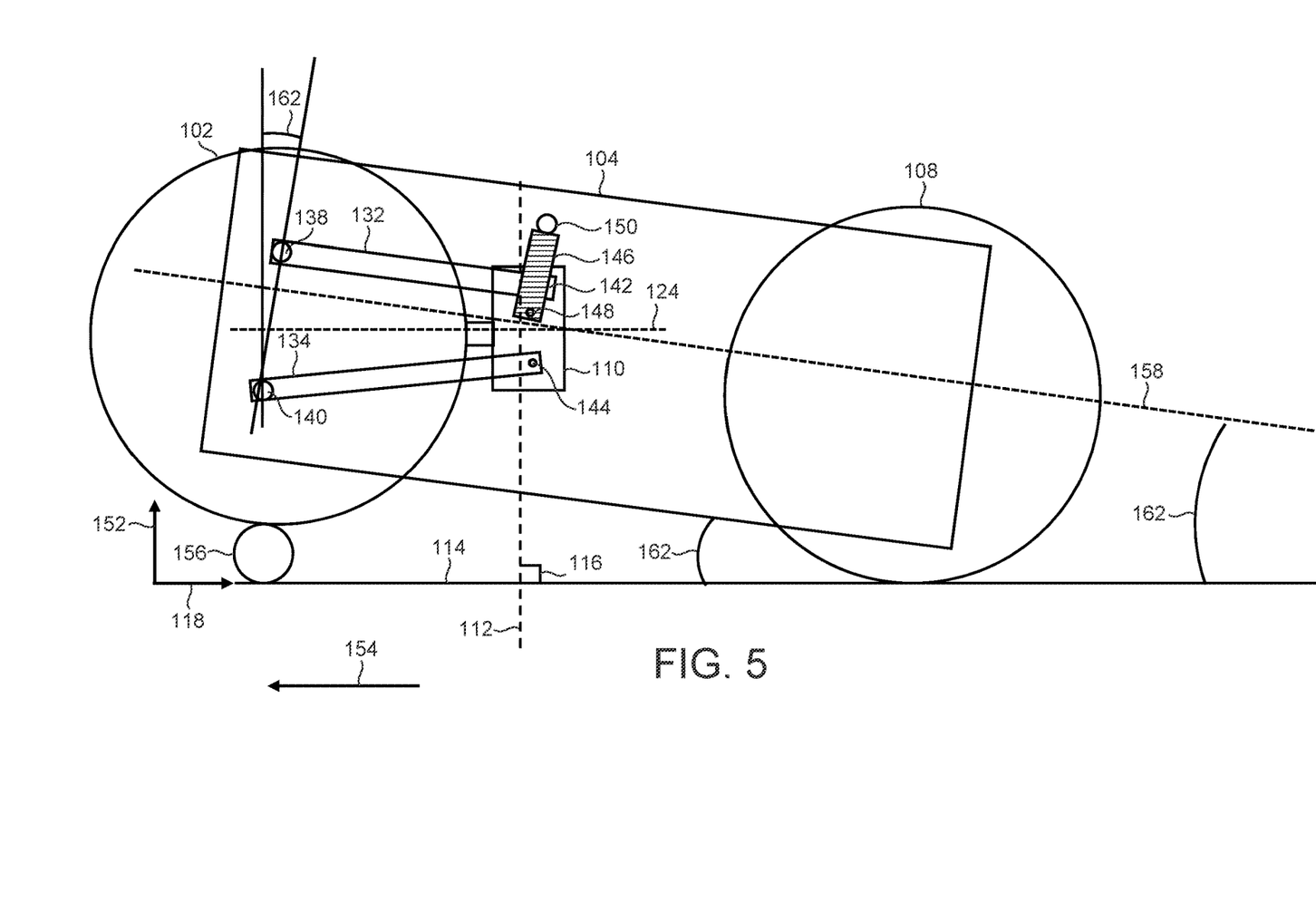
FIG. 5 is a schematic diagram of the robotic vehicle with the wheel arranged on top of the object.

From the position depicted in FIG. 4, the vehicle 100 continues moving in the first direction 154 until the wheel 102 is at its highest point on top of the object 156. FIG. 5 depicts the vehicle 100 at this point in time. In FIG. 5, the impact and vertical motion of the wheel 102 and axle housing 110 imparts a vertical displacement to one end of the chassis 104. The front end of the chassis 104 therefore rotates away from the surface 114 such that there is a non-zero angular displacement 162 between the chassis 104 (or longitudinal axis 158 of the chassis 104) and the reference surface plane. As a result of this rotation, the biasing member 146 extends, and the first and second suspension arms 132, 134 pivot about joints 138, 140, 142, 144 again. The relaxation of the biasing member 146 and rotation of the linkage assembly acts to maintain the axis 112 of the axle housing 110 at an angle 116 normal to the reference surface plane in response to the angular displacement 162 between the chassis 104 and the reference surface plane.

Figure 6:
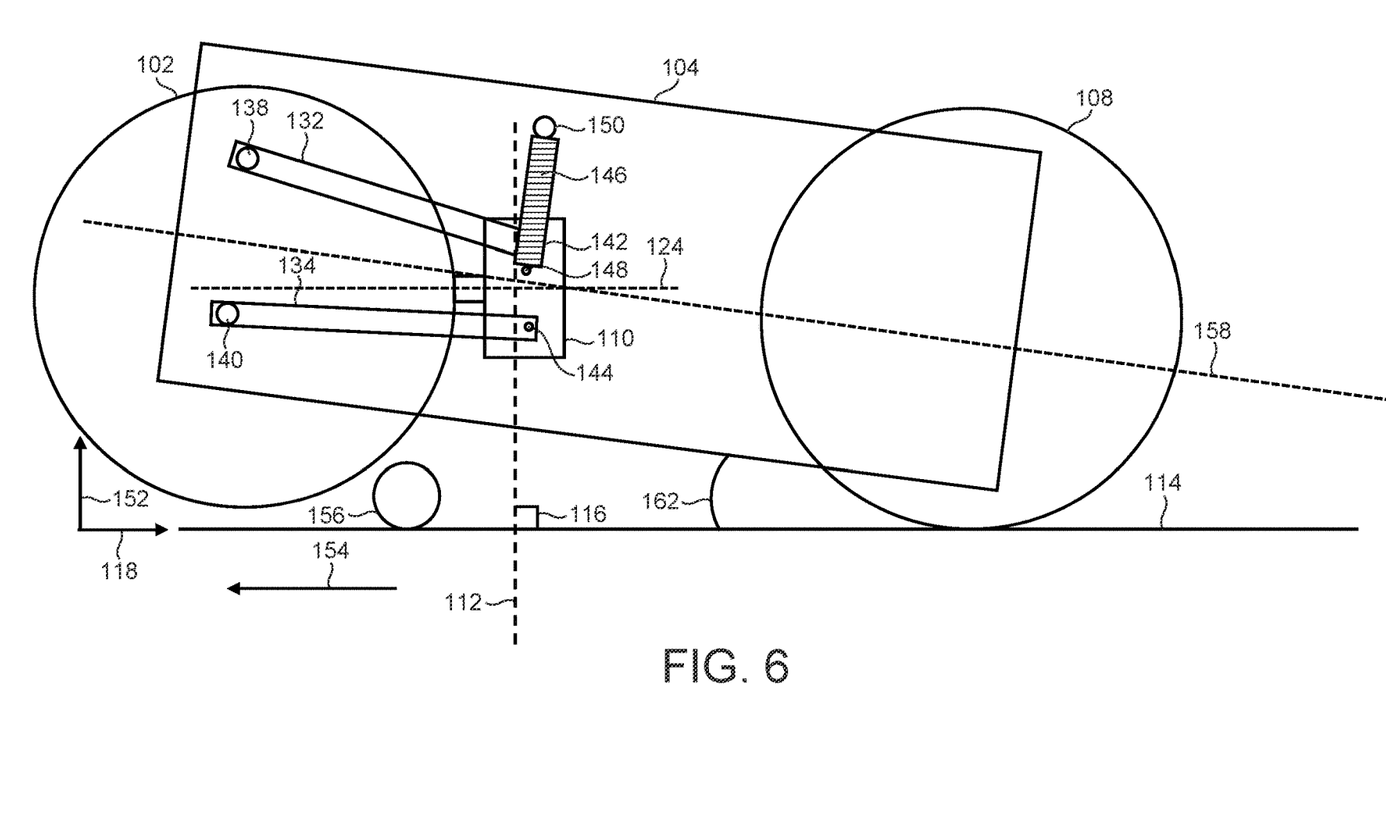
FIG. 6 is a schematic diagram of the robotic vehicle with the wheel arranged over the object.

From the position depicted in FIG. 5, the vehicle 100 continues moving in the first direction 154 until the wheel 102 travels beyond the object 156. FIG. 6 depicts the vehicle 100 at this point in time. In FIG. 6, the wheel 102 is no longer in contact with the object 156 and begins to move vertically towards the surface 114. The axle housing 110 also moves vertically downwards towards the surface 114. Due to inertia, the chassis 104 remains in a rotated configuration and has not yet begun to move towards the surface 114. As a result of the vertical movement of the wheel 102 and the axle housing 110, the biasing member 146 is extended and the first and second suspension arms 132, 134 pivot about joints 138, 140, 142, 144. The suspension system therefore permits relative vertical movement between the axle housing 110 and the chassis 104 and maintains the axis 112 of the axle housing 110 at an angle 116 normal to the reference surface plane.

When the wheel 102 contacts the surface 114 again, the chassis 104 also rotates towards the surface 114 to a position in which there is no angular displacement between the chassis 104 and the reference surface plane. This rotation is in the opposite direction to the rotation between the configurations shown in FIGS. 3 and 4. The suspension system therefore behaves in the same way and maintains the axis 112 of the axle housing 110 at an angle 116 normal to the reference surface plane due to the angular displacement of the chassis 104.

Accordingly, throughout the period of perturbation to the chassis 104, the suspension system has kept the axis 112 of the axle housing 110 vertically orientated. As mentioned, this improves control of the vehicle 100. As such, should the vehicle 100 need to change direction while the chassis 104 is in a rotated configuration, the vehicle 100 can do so quickly and accurately because the wheel 102 is in a known orientation.

As mentioned, the vehicle may comprise two linkage assemblies, with one on either side of the wheel. Through the use of two linkage assemblies, the suspension system can maintain the axis of the axle housing in the desired orientation regardless of the direction of travel of the vehicle 100 and wheel. For example, if the vehicle 100 is orientated as shown in FIG. 2, when the second and third wheels 106, 108 travel over the object 156, one of the linkage assemblies operates before the other. Accordingly, unlike in the examples of FIG. 3-6, the rotational axes of the second and third wheels 106, 108 are not parallel the direction of travel. For example, the rotational axis 164 of the third wheel 164 is not parallel with the direction of travel 154. Thus, as the third wheel 108 moves over the object 156, the most forward linkage assembly (and corresponding biasing member) will react to the object 156 before the trailing linkage assembly. The use of two linkage assemblies ensures that the axis of the axle housing remains vertically orientated regardless of the wheel orientation.

In addition, it should be noted that the suspension system of the front wheel 102 also maintains the axis 112 of the axle housing 110 at an angle 116 normal to the reference surface plane even when there is a vertical displacement between a rear wheel 106, 108 of the vehicle 100 and the reference surface plane. Thus, when the second and third wheels move over the object 156, the axes of all three axle housings remain vertically orientated.

The above examples are to be understood as illustrative. Further examples are envisaged. Any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A vehicle comprising:
a wheel to contact a surface having a reference surface plane in operation of the vehicle;
a chassis;
an axle housing having an axis which is normal to the reference surface plane;
an axle, extending from the axle housing, to couple the wheel to the axle housing and to support rotation of the wheel relative to the axle housing and, thereby, to support motion of the vehicle across the surface in operation of the vehicle; and
a suspension system coupling the wheel to the chassis, the suspension system comprising:
a linkage assembly having a first end pivotably coupled to the chassis and a second end pivotably coupled to the axle housing, the first end of the linkage assembly spaced apart laterally from the second end of the linkage assembly along a longitudinal axis of the linkage assembly;
wherein the suspension system is configured to maintain the axis of the axle housing at an angle normal to the reference surface plane in response to an angular displacement between the chassis and the reference surface plane.

2. The vehicle according to claim 1, wherein the angular displacement is imparted by at least one of:
a vertical displacement between the wheel and the reference surface plane;
a vertical displacement between a second wheel of the vehicle and the reference surface plane; and
a vertical displacement between the wheel and the second wheel of the vehicle.

3. The vehicle according to claim 1, wherein the suspension system is configured to permit relative vertical movement between the axle housing and the chassis.

4. The vehicle according to claim 3, wherein the suspension system comprises a biasing member connecting the axle housing to the chassis, the biasing member configured to accept compressive and expansive vertical displacements between the axle housing and the chassis.

5. The vehicle according to claim 4, wherein the biasing member is pivotably coupled to both the axle housing and the chassis.

6. The vehicle according to claim 3, wherein:
the first end of the linkage assembly is pivotably coupled to the chassis at a first joint and a second joint, the second joint spaced from the first joint;
the second end of the linkage assembly is pivotably coupled to the axle housing at a third joint and a fourth joint, the fourth joint spaced from the third joint.

7. The vehicle according to claim 6, wherein the linkage assembly comprises:
   a first suspension arm pivotably connected to:
      the chassis at the first joint; and
      the axle housing at the third joint; and
   a second suspension arm pivotably connected to:
      the chassis at the second joint; and
      the axle housing at the fourth joint.

8. The vehicle according to claim 6, wherein the linkage assembly comprises:
   a damper pivotably connected to the chassis at the first joint;
   a first suspension arm connected to:
      the damper; and
      the axle housing at the third joint; and
   a second suspension arm pivotably connected to:
      the chassis at the second joint; and
      the axle housing at the fourth joint.

9. The vehicle according to claim 8, wherein the damper is a rotary damper.

10. The vehicle according to claim 8, wherein the damper is a linear damper.

11. The vehicle according to claim 1, wherein the chassis comprises:
   an inner portion;
   a first outer portion arranged on a first side of the wheel; and
   a second outer portion arranged on a second side of the wheel; and
   wherein the axle housing resides:
      between first and second outer portions; and
      between the inner portion and the wheel.

12. The vehicle according to claim 11, wherein the first end of the linkage assembly is coupled to the first portion of the chassis on the first side of the wheel, and the longitudinal axis of the linkage assembly extends inwardly towards the inner portion of the chassis where the second end of the linkage assembly couples to a first side of the axle housing.

13. The vehicle according to claim 12, wherein the suspension system comprises a second linkage assembly having a first end pivotably coupled to the second outer portion of the chassis and a second end pivotably coupled to a second side of the axle housing, wherein the first end of the second linkage assembly is spaced apart laterally from the second end of the second linkage assembly along a longitudinal axis of the second linkage assembly, the longitudinal axis of the second linkage assembly extending inwardly towards the inner portion of the chassis where the second end of the second linkage assembly couples to the second side of the axle housing.

14. The vehicle according to claim 1, wherein the wherein the wheel is a holonomic wheel.

15. The vehicle according to claim 1, wherein the vehicle further comprises a second wheel and a third wheel, wherein the wheel, the second wheel and the third wheel are spaced apart equally around a central vertical axis of the chassis.

* * * * *